Figure 4:
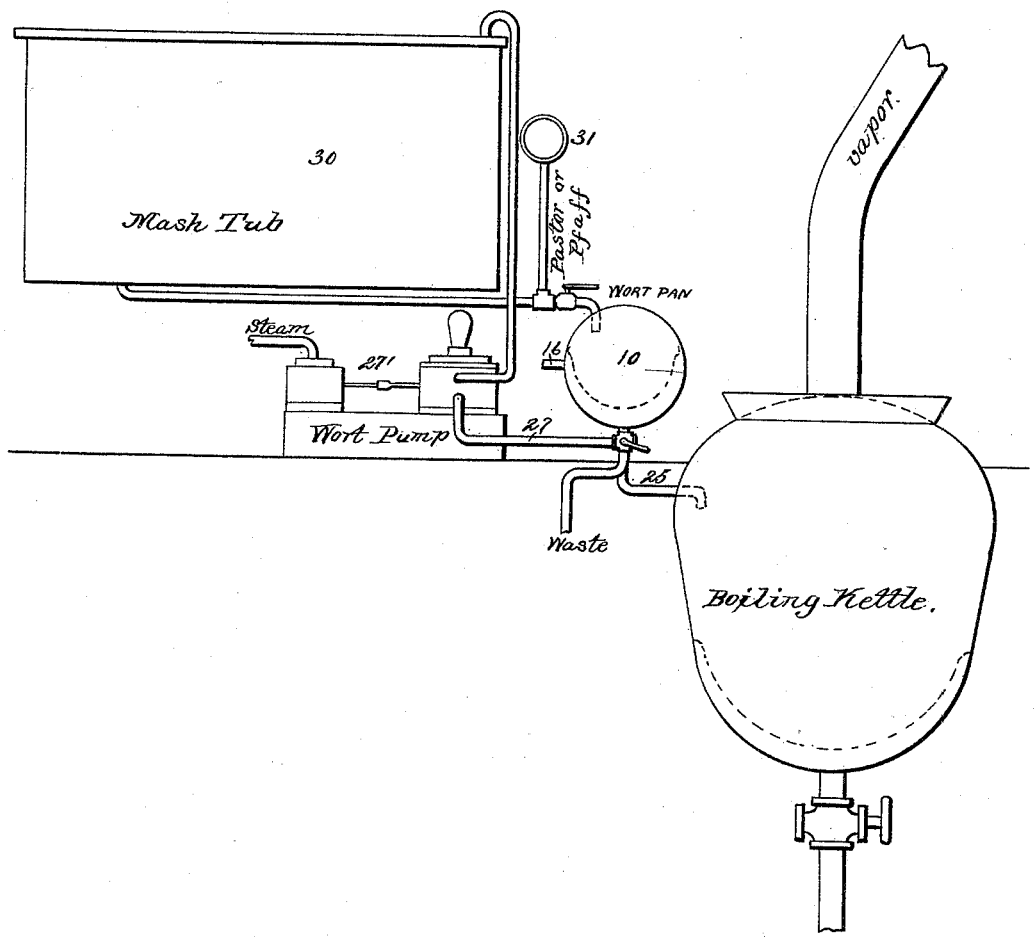

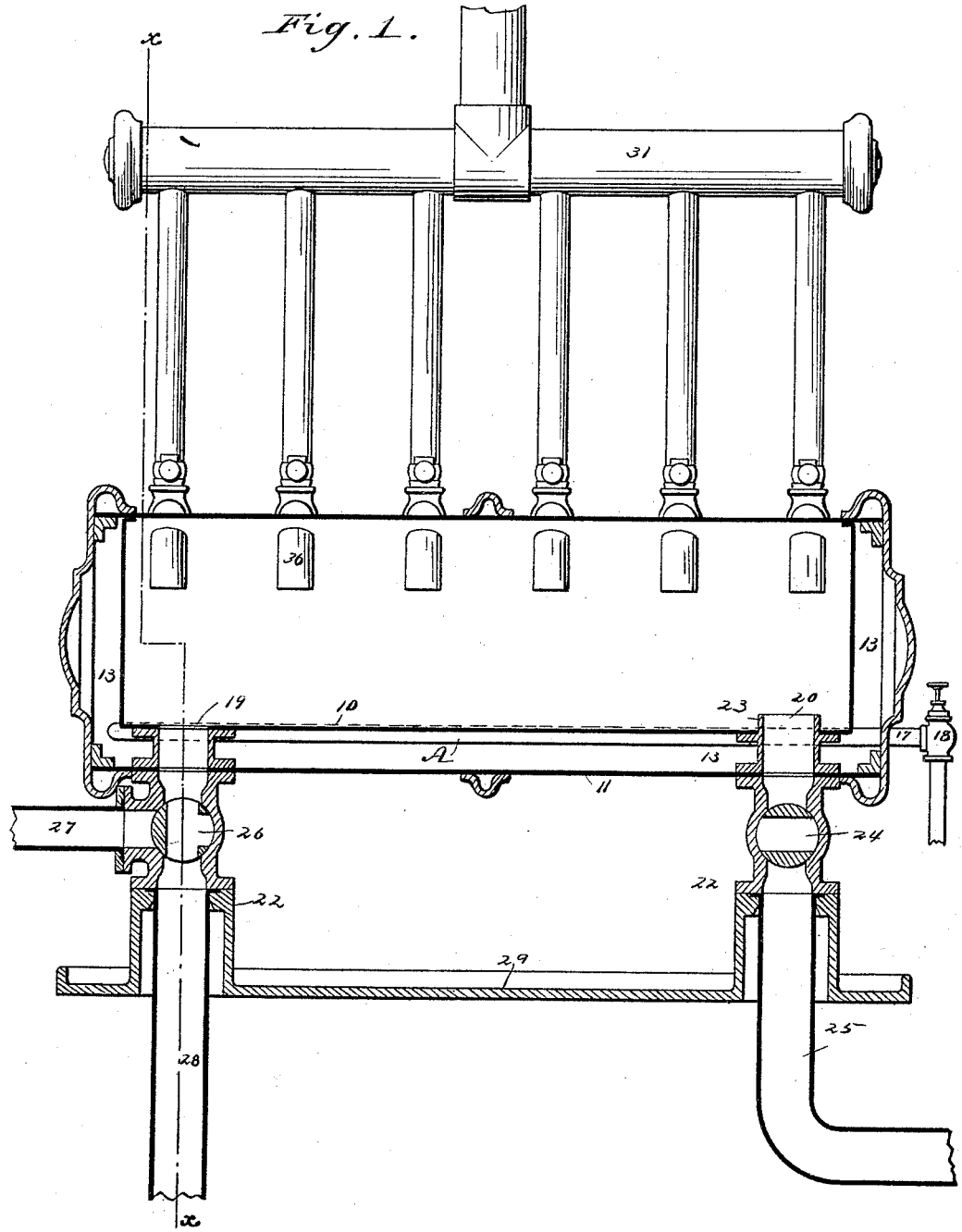

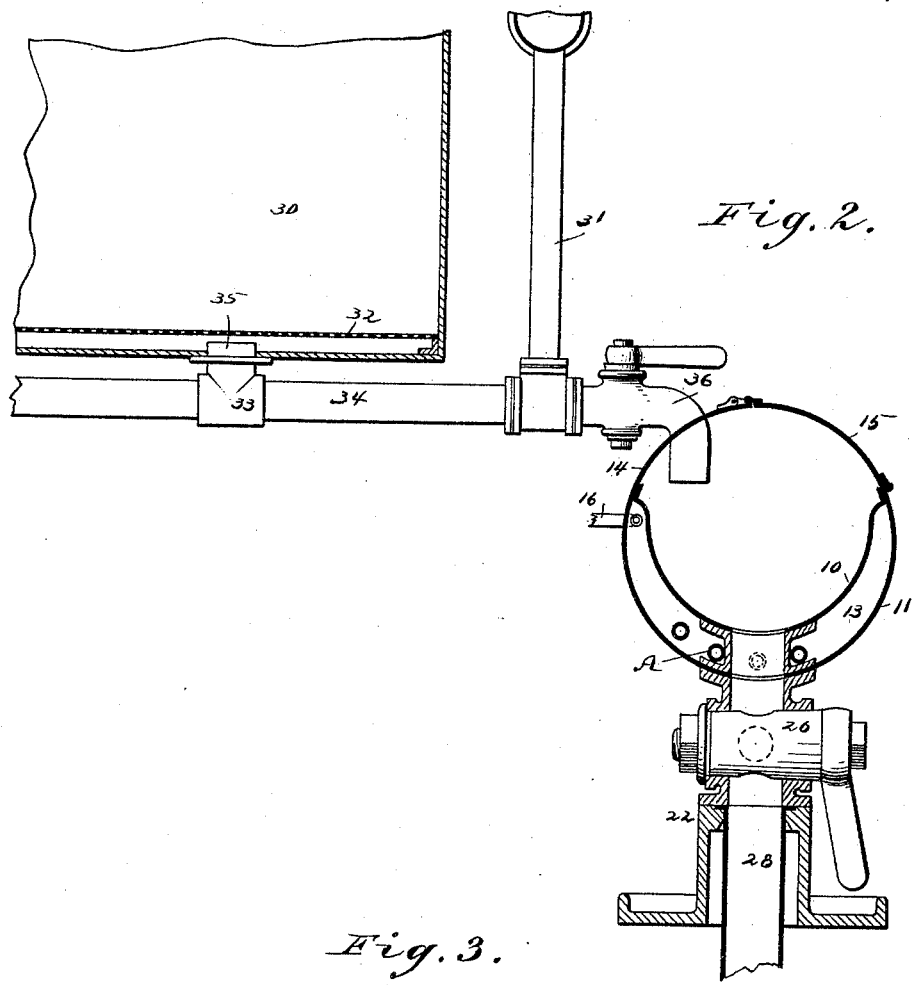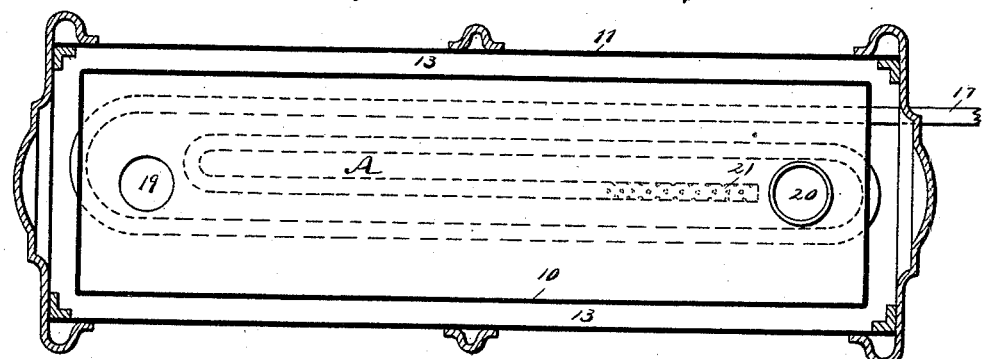

(No Model.)  3 Sheets—Sheet 3.

M. BYRNE.
APPARATUS FOR BREWING BEER.

No. 440,464. Patented Nov. 11, 1890.

UNITED STATES PATENT OFFICE.

MICHAEL BYRNE, OF NEW YORK, N. Y.

APPARATUS FOR BREWING BEER.

SPECIFICATION forming part of Letters Patent No. 440,464, dated November 11, 1890.

Application filed August 1, 1889. Serial No. 319,382. (No model.)

*To all whom it may concern:*

Be it known that I, MICHAEL BYRNE, of New York city, in the county and State of New York, have invented a new and Improved Apparatus for Brewing Beer, of which the following is a full, clear, and exact description.

My invention relates to an improvement in what is known as a "wort pan or grande" employed in the process of brewing beer, and has for its object to so construct the same that the beer-wort will be maintained at a higher and more regular temperature while in the pan than heretofore, and at the same time be effectually protected against scorching or coloration; and a further object of the invention is to provide against the wort cooling down as delivered by the taps of the mash-tub, and also to draw the wort from the pan without loss and in a convenient and expeditious manner.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a side elevation of the wort-pan, the mash-tub, the wort-pump, and boiling-kettle. Fig. 2 is a longitudinal section through the wort-pan, showing a portion of the pastor or pfaff in front elevation. Fig. 3 is a vertical transverse section on line $x\ x$ of Fig. 2, a partial vertical section through the mash-tub, and a partial side elevation of the pastor or pfaff; and Fig. 4 is a horizontal section through the wort-pan.

To the wort pan or grande 10 a jacket 11 is attached, preferably at the upper edges, which jacket incloses the sides and ends of the pan in such manner that a space or chamber 13 intervenes between the jacket and the contiguous surfaces of the pan, the said chamber being adapted to contain hot water. The jacket is continued upward beyond one side of the pan, partially covering the pan, as illustrated at 14 in Fig. 2, and to this upper jacket-extension a lid 15 is hinged or otherwise secured, which may contact with the opposite side of the pan. By this construction the top of the pan may be completely closed when desired to prevent the escape of heat and the possible cooling of the wort.

At one end of the wort-pan an overflow-pipe 16 is introduced into the upper portion of the hot-water chamber 13, and in the lower portion of said chamber a coil of pipe A is longitudinally placed, the location and form of the coil being best shown in dotted lines in Fig. 3, from which it will be observed that the pipe 17, which is a steam-pipe and provided with a suitable valve 18, is made to enter the chamber 13 at one end of the pan and coiled within the same, the said coils being preferably so arranged that one will be slightly below the other. The first coil passes around the exit-openings 19 and 20 contained in the bottom of the pan, and the coil is made to terminate, preferably, between the openings 19 and 20, near one of the openings—the opening 20, for instance—and the end of the coil is ordinarily made to rest near the inner face of the jacket 11, the extremity of this end portion being closed. About twelve inches of the length of the terminal end of the coil is perforated with minute holes 21, of a size and in sufficient number to permit the steam passed through the coil to noiselessly escape and produce a uniform and continuous circulation of steam in the coil to keep the water contained in the chamber at or near a uniform temperature. The steam exhausting into the water-chamber keeps up the supply of water therein, as well as preventing noise.

The wort-pan 10 is supported by tubular standards 22, preferably two in number, which standards pass through the jacket and are attached to the bottom of the pan around the openings 19 and 20 therein. The standard attached around the opening 20 is carried through the said opening a slight distance, and the extension 23 of the standard thus obtained in the pan is purposed to prevent any sediment from passing down through the standard when the wort is drawn off. The standard provided with the extension 23 is also fitted with a stop-cock 24, of any suitable or approved construction, and in the standard an offtake-pipe 25 is inserted, which offtake-pipe is adapted to lead to the boiling-kettle 25'. The other tubular standard does not extend upward within the wort-pan, and is provided with a three-way cock 26 and pipes 27 and 28, the pipe 28 being the waste-pipe and the pipe 27 leading to the wort-pump 27'.

The tubular standards 22 may be and preferably are connected by a suitable form of base-plate 29. It will be understood that a steam and water tight joint is made where the standards pass through the jacket and the wort-pan.

In connection with the wort-pan I have illustrated a mash-tub 30 and a portion of the pastor or pfaff 31 used in connection with the tub, the mash-tub being provided with a false perforated bottom 32, (see Fig. 2,) supported a distance above the main bottom, and the branch tubes 33, which connect the horizontal pipes 34 of the pastor or pfaff with the mash-tub, extend upward within the same a distance above the main bottom, as illustrated at 35 in Fig. 2, whereby the malt extract may be readily run off from the tub; but the sediment which collects between the false or auxiliary bottom and the main bottom will be prevented from entering the branch tubes.

The term "pastor," or in German "pfaff," is that used in the art to designate the series of vertical tubes connected at their lower ends to the tubes 34 in rear of the valves or faucets 36 and at their upper ends to a cross-pipe having a central inlet-pipe. This pastor or pfaff forms no part of my invention, and hence needs but brief mention, and it will be sufficient to state it feeds hot water to the mash-tub 30 during the mashing process, and also supplies hot water for cleansing the pipes and faucets when the tub is being prepared for the next mash. The faucets 36 of the pastor or pfaff 31 are projected downward from the housing 14 of the wort-pan, as shown in Figs. 2 and 3.

In operation the grain, meal, or grist is introduced into the mash-tub 30 and water supplied thereto from the pastor or pfaff in the usual manner. The wort collects in the space below the false bottom 32, is conducted therefrom at the proper time into the wort-pan 10, from which it may either be returned, with or without being heated, to the upper end of the mash-tub for further treatment therein, or it may be carried off through the pipe 25 to the boiling-kettle 25', where the hops are added and treated in the usual manner.

In the operation of the wort-pan the chamber 13 is first filled with water, and then a small quantity of live steam is admitted through the valve 18 into the coil, and this steam upon its admission expels the cold air and water that have accumulated in the coil, and, becoming partially condensed, itself passes out through the perforated end of the coil into the chamber, rapidly replacing and raising the temperature of the water therein contained to the boiling-point and maintaining the water at that temperature by the gradual condensation or absorption of the live steam circulated continuously in the aforesaid coil; but at no time will the internal surface of the heating-pan be over 210° or 212° Fahrenheit, thereby preventing what is known to practical brewers as "scorching" or "coloration" of the beer-wort, which generally follows if at this stage of the process the delicate beer-wort is brought in contact with live-steam-heated surfaces, more especially so if small quantities of wort are thinly distributed over the said steam-heated surfaces.

The water-jacket I employ in connection with the wort-pan not only prevents the risky cooling down of the wort as delivered by the tubes 33, but, what is still more important, gradually raises the heat of the wort several degrees with absolute safety by contact with the large internal water-heated surface of the pan continued during the entire time of running off the malt extract. This materially aids the brewer at one of the most important and delicate stages of the primary process in securing in the boiling-kettle a sound, stable, and pale wort, greatly facilitating uniform results in the beer during and after its fermentation.

In connection with the water-jacket I obtain absolute safety from loss in the operation of drawing the wort from the wort-pan by using the stop-cocks under the pan, and every facility for cleaning internally and externally is provided, while an ornamental appearance, strength, and simplicity of construction are combined and economy in manufacture obtained, as with reference to the latter the standards supporting the pan are utilized as conduits for the wort.

I desire it to be distinctly understood that I do not confine myself to the exact arrangement of the coil in the water-chamber shown and described, it simply being necessary that the coil be introduced into the said chamber and that the terminal end be perforated.

Having thus described my invention, I claim as new and desire to secure by Letters Patent—

1. In a brewing apparatus, the combination, with the mash-tub, the wort-pump discharging into the top thereof, and the boiling-kettle, of a water-jacketed wort-pan, a steam-pipe discharging into the water-space, valved pipes leading from the bottom of the mash-tub into said wort-pan, a valved pipe leading from the wort-pan to the said pump, and a pipe leading from the wort-pan to the boiling-kettle, substantially as set forth.

2. The combination, with the wort-pan, its water-jacket, and the mash-tub provided with pipes discharging into the pan, of tubular standards 22, extending through the jacket into the bottom of the pan at its ends, a cock, and offtake-pipe in one standard, a three-way cock 26 in the other standard, and a wort-pump pipe and a waste-pipe connected with said standard at said valve, substantially as set forth.

3. The combination, with a wort-pan, of tubular standards supporting the same and connected with the interior of the pan, one of said standards projecting upward above the bottom of the pan, forming an interior collar, stop-cocks located in said standards, a pipe connected with the standard containing the inwardly-extending collar adapted to lead to the boiling-kettle, and pipes connected with the other standard leading to the waste and wort pump, substantially as and for the purpose specified.

4. The combination, with a wort-pan provided with a surrounding jacket forming a chamber adapted to receive water, and a steam-pipe introduced and coiled within the said chamber and terminating therein, the terminal end of the coil being closed and the peripheral surface perforated, of tubular standards supporting the pan and extending through the jacket and connected with the pan, stop-cocks located in said standards, and connections between said standards, the boiling-kettle, the waste and the wort pump, substantially as shown and described.

MICHAEL BYRNE.

Witnesses:
J. F. ACKER, Jr.,
C. SEDGWICK.